(12) United States Patent
Wild et al.

(10) Patent No.: US 6,349,699 B1
(45) Date of Patent: Feb. 26, 2002

(54) METHOD OF AND DEVICE FOR OPERATING A VACUUM ACCUMULATOR OF AN INTERNAL COMBUSTION ENGINE, PROVIDED FOR SERVO FUNCTION

(75) Inventors: Ernst Wild, Oberriexingen; Wolfgang Wagner, Korntal-Muenchingen; Gerard Melchior, Schwieberdingen; Klaus Ries-Mueller, Bad Rappenau; Matthias Kuesell, Leonberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/510,453

(22) Filed: Feb. 22, 2000

(30) Foreign Application Priority Data

Feb. 26, 1999 (DE) .......................................... 199 08 687

(51) Int. Cl.$^7$ ............................. F02D 9/02; B60T 13/46
(52) U.S. Cl. ......................................... 123/336; 73/116
(58) Field of Search ................................. 123/336, 337, 123/376, 389, 399; 73/117.3, 117.2, 115, 116, 118.1, 118.2; 701/101, 102, 103

(56) References Cited

U.S. PATENT DOCUMENTS 5,753,805 A * 5/1998 Maloney .................. 701/103 X
6,033,038 A * 3/2000 Kulkarni et al. ......... 303/114.3

* cited by examiner

Primary Examiner—Tony M. Argenbright
(74) Attorney, Agent, or Firm—Michael J. Striker

(57) ABSTRACT

A method of operating an internal combustion engine of a motor vehicle provided with a vacuum accumulator which provides an auxiliary energy required for at least one servo function of the internal combustion engine in form of a vacuum and which is acted upon by a vacuum acting in a suction pipe of the internal combustion engine. The method computes a pressure acting in the vacuum accumulator, supplies mass flows to the vacuum accumulator when at least one servo function is performed, and withdraws the mass flows from the vacuum accumulator when a pressure acting in the suction pipe is smaller than the pressure acting in the vacuum accumulator. The pressure acting in the vacuum accumulator is computed from a mass balance of the mass flows supplied to the vacuum accumulator and withdrawn from the vacuum accumulator.

17 Claims, 4 Drawing Sheets

METHOD OF AND DEVICE FOR OPERATING A VACUUM ACCUMULATOR OF AN INTERNAL COMBUSTION ENGINE, PROVIDED FOR SERVO FUNCTION

BACKGROUND OF THE INVENTION

The present invention relates to a method of operating of a vacuum accumulator provided in an internal combustion of a motor vehicle, which provides an auxiliary energy required for a servo function of the internal combustion engine in form of a vacuum, and which is loaded with a vacuum acting in a suction pipe of the internal combustion engine.

The present invention also relates to a corresponding control device for such an internal combustion engine.

In motor vehicles it is known that servo braking systems and servo steering systems draw their auxiliary energy from a vacuum accumulator which is connected to a suction pipe. This suction pipe serves for supplying the internal combustion engine with air or oxygen required for combustion. The suction pipe vacuum is stored in the vacuum accumulator, and it is connected through a check valve with the suction pipe.

In order to provide a sufficient servo support, for example servo braking force, a sufficiently long vacuum must be maintained in the suction pipe, in order to guarantee the corresponding vacuum in the vacuum accumulator. With a low suction pipe pressure, air flows from the accumulator into the suction pipe. The pressure in the vacuum accumulator drops thereby minimal to the suction pipe pressure. During the actuation of the brake, the vacuum is connected through a valve with an adjusting device which amplifies the braking force. Thereby air flows into the vacuum accumulator and increases the accumulator pressure.

In the internal combustion engines of the above mentioned general type, a throttle flap is further provided in the suction pipe, for adjusting the air supplied into the combustion chamber. In conventional internal combustion engines, in particular in an Otto motor, the throttle flap closes often in the cases in which the driver during braking removes the foot from a gas paddle, whereby a substantial present accumulator vacuum remains obtained. Therefore in such internal combustion engines it is guaranteed that also during a braking process the vacuum accumulator provides the vacuum required for the servo brake and also during a long braking process.

In the new internal combustion engines with gasoline direct injection (GDI) it is however no longer guaranteed. For example, during a heating process of a substantially available catalyst, the throttle flap opens so wide that no longer sufficient vacuum is provided in the suction pipe and in the vacuum accumulator the vacuum required for the servo system no longer can be available.

Furthermore, in the internal combustion engines with GDI the throttle flap is controlled depending on the position of the pedal value transmitter, thereby suction pipe vacuum for servo functions is available only in a limited extent. Examples for this are operational conditions during the suction pipe injection with a late ignition angle for heating of the catalyst in hot operation. In these operational conditions a desired efficiency great worsening must be compensated by opening of the throttle flap. This leads to an increase of the suction pipe pressure. The shift region during direct injection is a comparable operational condition, in which the throttle flap also in condition of low load is completely open and thereby no suction vacuum is available.

It therefore can be seen that during the operation of the vehicle at high level, for example during mountain driving, the difference with respect to the atmospheric pressure is no longer sufficient for the servo function.

It is especially critical that with the servo braking system in the event of sufficient vacuum, there is no braking force available, or the desired operational condition can not be reached from safety regions, which lead to worsening in exhaust gas or consumption.

It is known to provide helping measures in that the throttle flap opening is designed so that always a sufficient vacuum is formed. During the catalyst heating it leads for example to the situation that the design of the throttle flap opening can not be considered as optimal for exhaust gas. In GDI-operating vehicles further a vacuum switch is used. When the pressure in the braking force amplifier exceeds a threshold value, the shift operation is switched to homogenous operation.

As an alternative solution, an additional vacuum pump or servo pump is integrated in the vehicle, for compensating for substantially failing differential pressure. This leads however to increased costs.

SUMMARY OF THE INVENTION

It is therefore an object of present invention to provide a method of and a device for operating a vacuum accumulator for servo functions, which avoid the disadvantages of the prior art and in particular increase the operational safety during the operation of the vacuum accumulator, which can be used for machine applications, and thereby with the safer operation of the vacuum accumulator minimizes cost expenses.

In keeping with these objects and with others which will become apparent hereinafter, one feature of present invention resides, briefly stated in a method in which the pressure acting in the vacuum accumulator is determined by computations. In accordance with the basic model, mass flows are supplied to the vacuum accumulator when at least one corresponds to a servo function, and the mass flows are guided from the vacuum accumulator when the pressure acting in the suction pipe is smaller than the pressure acting in the vacuum accumulator. The pressure acting in the vacuum accumulator is supplied from the mass balance of the vacuum accumulator and computed from the mass flows withdrawn from the pressure accumulator.

The basic concept which underlies the present invention is that the pressure in the vacuum accumulator and thereby also the vacuum in a servo system, for example of the braking force amplifier, is determined by a computations from known signals. The difference pressure in the vacuum accumulator or the accumulator of the servo system is computed by a model. This model determines from the mass balance of the inflow and outflow of air in the accumulator volume, the corresponding pressure in the accumulator.

The compressibility of the gas in the accumulator can be taken into consideration by the state equation for ideal gas. The mass flow in the accumulator can preferably be computed from the difference of the accumulator pressure and the suction pressure with consideration of the flow resistance in the conduits to the accumulator. The mass flow flowing out from the accumulator can be determined from the traveling conditions, for example a curve travel with a corresponding action on the servo steering system or a vehicle deceleration with a corresponding action on the servo braking system.

In known internal combustion engines, the initial variables on which the inventive concept is based are known from the corresponding motor control, for example the motor control system "Motronic". For example in anti blocking braking system (ABC) interfaces to motor control are available, which transmit the air consumption in the servo brake to the motor control. Also, the informations about a suction pipe pressure, atmospheric pressure and changes of the vehicle speed are conventionally available in the known motor controls. The additional required sensors such as a pressure sensor or pressure sensors in the pressure accumulator are also available in corresponding systems. Therefore during a realization of the inventive method advantageously no additional component features are needed for existing internal combustion engines.

In accordance with a preferable embodiment, the required differential pressure is compared with the available differential pressure. If there is no sufficient differential pressure available, the motor operational state changes. An operational state with increased suction pipe pressure is adjusted by a reduced throttle flap opening of the motor control.

In a further embodiment of the invention, an additional throttling is performed in the shift operation. During a catalyst heating by means of late ignition angle, an optimal ignition angle for the efficiency is a priority before the catalyst heating. Thereby, the motor requires less air mass flow, the throttle flap can be closed and the suction pipe pressure reduced.

The changes of the operational state with increased suction pipe vacuum can be provided further by engagement with the efficiency factor or the operation state factor of the motor control. Also, direct engagement with the ignition angle during the motor control is desirable with modeling of efficiency or operation state.

In motor control concepts for optimization of consumption and exhaust gas ratio, operational stakes with high suction pipe pressure occur. In correspondence with the proposed method, with a not sufficient vacuum in servo system, by changing the operational state, a sufficient vacuum in the servo system is guaranteed. The proposed method makes possible to get rid of a pressure sensor provided in the vacuum accumulator or, when the pressure sensor is available, a corresponding operational monitoring of the sensor.

In accordance with a preferable embodiment of the inventive method, the mass flows supplied to the vacuum accumulator and/or the mass flows withdrawn from the vacuum accumulator are summed progressively with the corresponding sign or integrated. The content of the vacuum accumulator can be therefore adjusted continuously and dynamically to the corresponding available mass flow and obtain a prediction of the pressure acting in it at any time. The corresponding mass flows can be summed either as discreet air volumes or integrated as infinitesimal air volume changes.

In the inventive method it further can be provided that mass flows are withdrawn from the vacuum accumulator only when the difference between the pressure acting in the suction pipe and the pressure acting in the vacuum accumulator exceeds a predetermined threshold value. In the technical reality, between the vacuum accumulator and the suction pipe, a check valve is arranged, which thereby taken into consideration in view of the proposed threshold value during computation of the inventive model. The threshold value can be adjusted in an advantageous manner to the corresponding physical conditions and thereby serve as an additional parameter for optimization of the proposed model. Moreover, with the parameters, substantially occurring pressure losses due to flow resistance in the conduits can be considered.

In the model computation on which the present invention is based, it can be provided that the mass flows supplied to the vacuum accumulator and/or withdrawn from the vacuum accumulator can be computed from operational conditions of the internal combustion engine, in particular from traveling conditions of the motor vehicle. At the one hand the pressure acting in the suction pipe depends on the operational conditions of the internal combustion engine as the air supplied from the suction pipe into the combustion chamber depends form the corresponding condition of the combustion, and on the other hand the air supplied to the suction pipe or through the throttle flap is controllable. In a motor vehicle, parameters such as the vehicle speed or the braking deceleration can be considered when from it it can be concluded what are the air masses supplied through a braking force amplifier to the vacuum accumulator.

In accordance with a further advantageous embodiment of the inventive method, it can be provided that the mass flows supplied to the vacuum accumulator can be computed by a stepped function which is triggered by a signal flank representative of the reaction of a servo function. By this proposed feature, the technical reality is in correspondence was for example in the case of a braking force amplifier with an action of the braking force amplifier provided during a braking maneur with a corresponding braking force which corresponds to the volume stream supplied to the vacuum accumulator in substantially a stepped function with a substantially constant time length per brake engagement. The proposed stepped function can be modeled in particular in form of a monoflop.

When the pressure in the vacuum accumulator is modeled in accordance with the invention, it can be further provided that in dependence on the pressure which is computed from the mass balance and acts in the vacuum accumulator, a lowering engagement of the pressure in the vacuum accumulator on the internal combustion engine, in particular an adjustment of a throttle flap provided substantially in the suction pipe is performed. By this engagement the vacuum required for the servo system can be automatically provided during exceeding of pressure threshold, without any engagement or an interaction by the driver. With this embodiment it is therefore guaranteed that a corresponding vacuum is provided every time.

Alternatively, in accordance with a further embodiment of the inventive method, it can be provided that in dependence on the pressure which is computed from the mass balance and acts in the vacuum accumulator, a corresponding flag (bit B-spl) is set, and in particular a control or warning signal is emitted. In this embodiment a lowering engagement of the pressure in the vacuum accumulator is not provided on the internal combustion engine automatically. Instead, first a corresponding bit is set which further on is capable to release a corresponding control or warning signal. Thereby, the driver can be released from the required corresponding counter features.

In accordance with a further preferable embodiment of the present invention, it can be provided that the computed pressure acting in the vacuum accumulator is used for an operation monitoring of a substantially provided pressure sensor. The model-based computed determination of the pressure acting in the vacuum accumulator is set as a further safety device of a corresponding internal combustion engine and makes possible the tracking of an operational course of an available pressure sensor.

It is therefore to be clear that from different servo functions provided in a motor vehicle, in regard to the maximum driver's safety, the braking servo function has a preference with respect to the other servo functions. Therefore, in accordance with an advantageous embodiment of the present invention, in the case of insufficient vacuum in the vacuum accumulator, functions such as steering servo or resonance flap control can be preliminarily deactivated, in order to guarantee at least a sufficient braking servo function.

During the modeling of the mass flow which flows into or out of the vacuum accumulator, in addition in a first preferable approximation it can be assumed that the sum of the air flow flowing in and flowing out is constant. During the dimensioning of the integrator/summator of the mass flow which flows in and flows out, a lower limit can be determined by a pressure acting in the suction pipe and an upper limit can be determined by the atmospheric pressure.

It is especially important that the inventive method is realized in the form of a control element which is provided for a control device of an internal combustion engine, in particular of a motor vehicle. A program is stored in the control element, which runs on a computing device, in particular on a microprocessor and is suitable for performing the inventive method. In this case the invention can be realized also by a program stored in the control element, so that such a control element provided with the program represents the invention in the same way as the method which is suitable for performing the program. A control element can be in particular an electrical storage medium for the use, such as for example a read-only memory.

In the control device in accordance with the present invention provided for a corresponding internal combustion engine, means are provided for determination of the actuation of at least one servo function, means for sensing of the pressure acting in the suction pipe, and means for computation of the pressure acting in the vacuum accumulator, which provide that the mass flow is supplied to the vacuum accumulator when at least one servo function responds, and the mass flows are withdrawn from the vacuum accumulator when the pressure acting in the suction pipe is smaller than the pressure acting in the vacuum accumulator. It is provided that the pressure acting in the vacuum accumulator is supplied from the flow balance to the vacuum accumulator and computed from the mass flows withdrawn from the vacuum accumulator. Data detecting means are provided in this case, for example a switch or a sensor for detecting the actuation by means of a servo function, or a brake switch or a brake light switch for detecting a braking action, as well as means for detecting a suction pressure required for the model computation. Moreover, means are provided for processing of these recovered informations, in accordance with the proposed model.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENT

Figure 1:
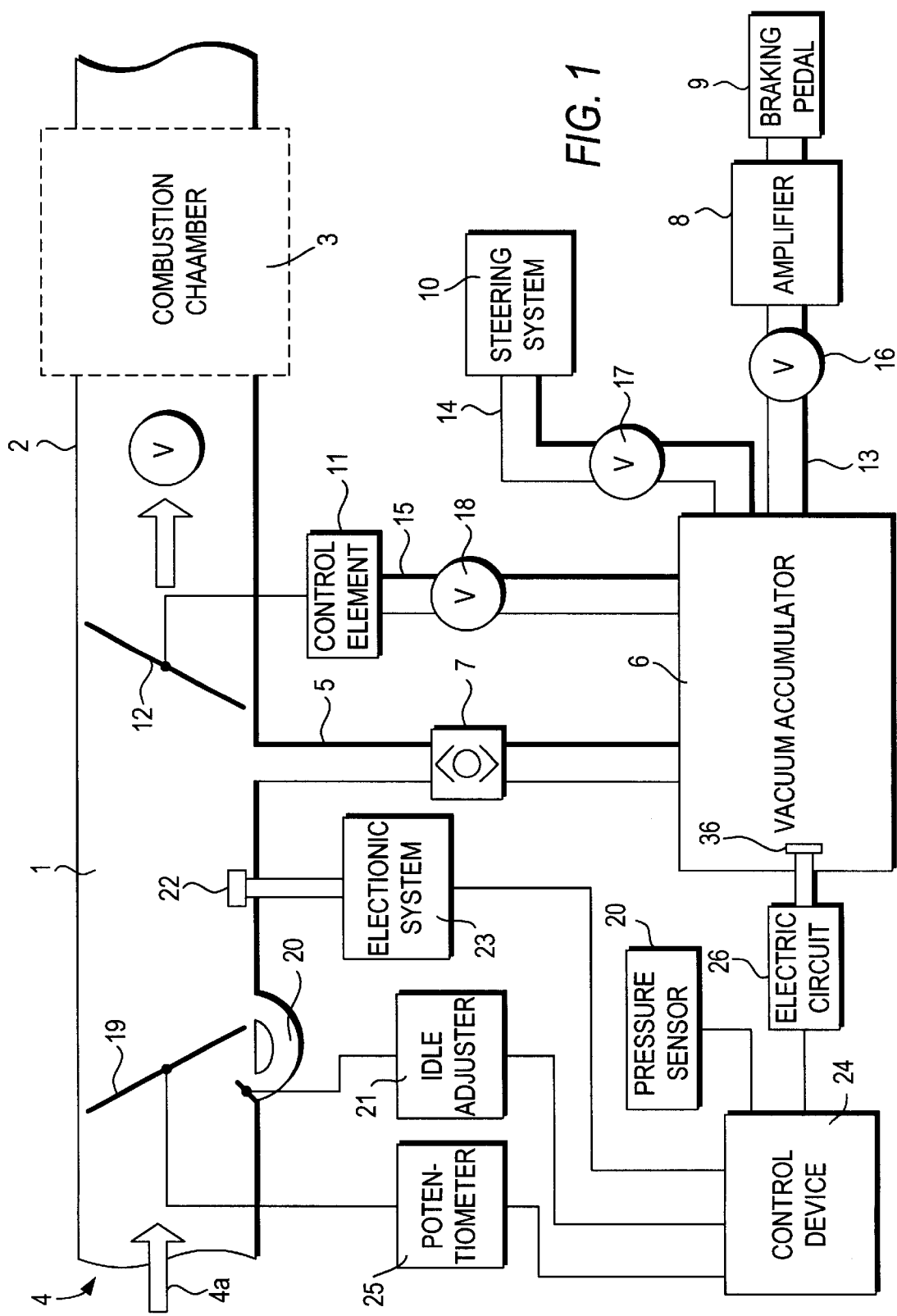
FIG. 1 is a view showing a block diagram of an inventive internal combustion engine of a motor vehicle.

An internal combustion engine shown in FIG. 1 has a suction pipe which is connected with a combustion chamber 3 of the internal combustion engine by a valve 2 which is not shown in detail. The supply of air into the suction pipe is performed through an opening 4. The suction pipe 1 is in a pressure-conductive communication with a vacuum accumulator 6 through a conduit 5. A check valve 7 is arranged in a conducting path. Servo devices for motor vehicle, which are integrated in the shown internal combustion engine, are in a pressure-conductive communication with the vacuum accumulator 6. As servo systems, in the shown embodiment a brake force amplifier 8 is provided. It is in pressure-conductive connection with a braking pedal 9 through a not shown main brake cylinder, as well as a steering servo system 10 and a resonance flap control element 11. A resonance flap 12 supplies an auxiliary energy which is required for the operation. These servo systems are connected in a pressure-conductive way with the vacuum accumulator 6 through the conduits 13, 14, 15.

Further valves 16, 17, 18 are provided at the pressure conduits 13, 14, 15. They can bring the individual servo systems to a pressure-conductive communication with the vacuum accumulator when needed. Air flows in the pressure pipe 5 between the suction pipe 1 and the vacuum accumulator 6 in one of the both directions 18, depending on whether the pressure in the suction pipe is smaller or greater than in the vacuum accumulator 6. The above mentioned check valve 7 serves so that the air flow in direction of the vacuum accumulator is avoided and thereby the vacuum accumulator 6 is not running with air, as long as a higher pressure acts in the suction pipe 1 than in the vacuum accumulator 6.

In the suction pipe 1 in the vicinity of the opening 4, a throttle flap 19 is provided. It regulates an air flow 4a which flows into the suction pipe. Through an additional bypass conduit 20 it can be guaranteed that in an idle operation of the internal combustion engine sufficient air is supplied to the suction pipe. The control of the bypass conduit 20 is performed through an idle adjuster 21.

Furthermore, a pressure sensor 22 is provided in the suction pipe and performs the measurement of the pressure acting in the suction pipe. The signal supplied by the pressure sensor 22 can be supplied first to a suction pipe pressure to an electronic system 23 or directly to an electronic control device.

In correspondence with this, the output signal of the idle running adjuster 21 is supplied to the electronic control device 24. Furthermore, the position of the throttle flap 19 is determined by a throttle flap potentiometer 25 and the corresponding measuring signal is supplied to the electronic control device 24 as well.

As further pressure informations, on the one hand the pressure acting in the vacuum accumulator 6 is supplied by a pressure sensor 36 to the control device 24 through pressure sensor electronic circuit 26 which in some cases is available. The atmospheric pressure required for the inventive model is finally determined by means of an atmospheric pressure sensor 28 of the control device 24.

Figure 2:
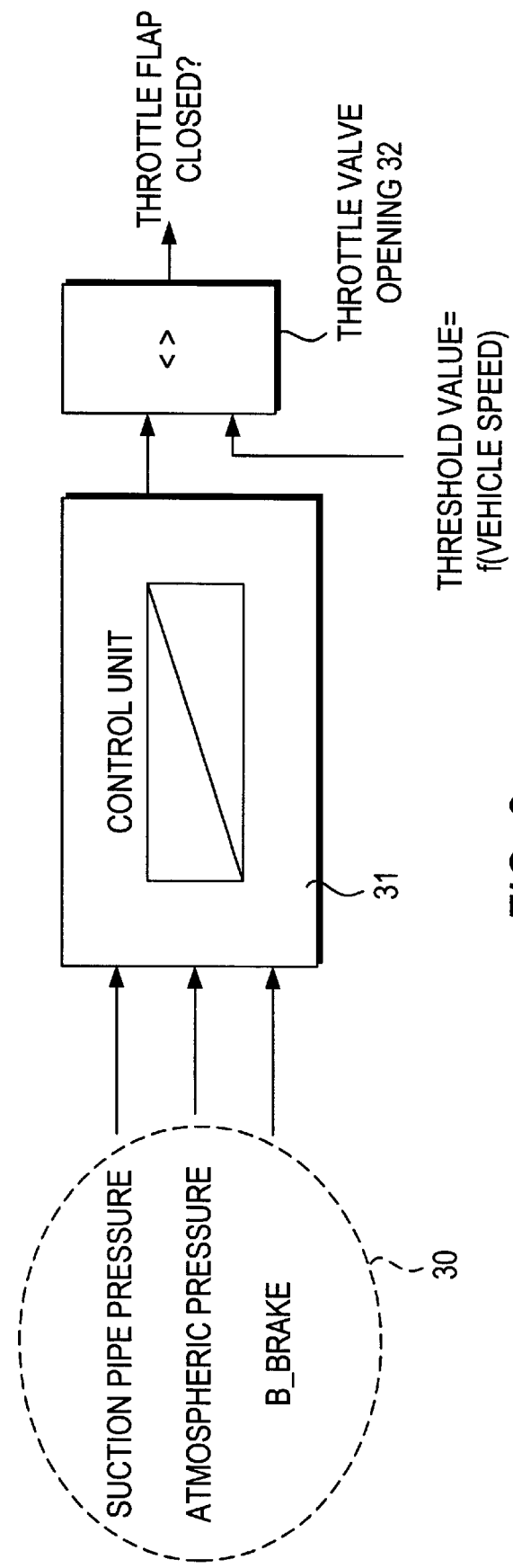
FIG. 2 is a schematic block diagram for illustration of the inventive method.

In accordance with a preferable embodiment of the invention which is schematically shown on the block diagram of FIG. 2, the pressure in the vacuum accumulator and thereby also the vacuum in a servo system or the brake force amplifier is determined by computing from known signals 30. The differential pressure in the vacuum accumulator or the accumulator of the servo system is computed by the inventive proposed model. This model determines the corresponding pressure in the accumulator from the mass balance of the inflow and outflow of air in the accumulator values.

In the motor control system "Metronic" of the applicant, the corresponding informations about suction pipe pressure, atmospheric pressure and changes of the vehicle speed are available. The additional required sensors such as a pressure sensor or pressure sensors in the pressure accumulator are also available in the existing systems. The required differential pressure is compared in a control unit 31 with the available differential pressure. If no sufficient differential pressure is available, the motor operational condition is changed at 32. An operational condition with an increased suction pipe pressure is adjusted by a reduced throttle flap opening 32.

Figure 3:
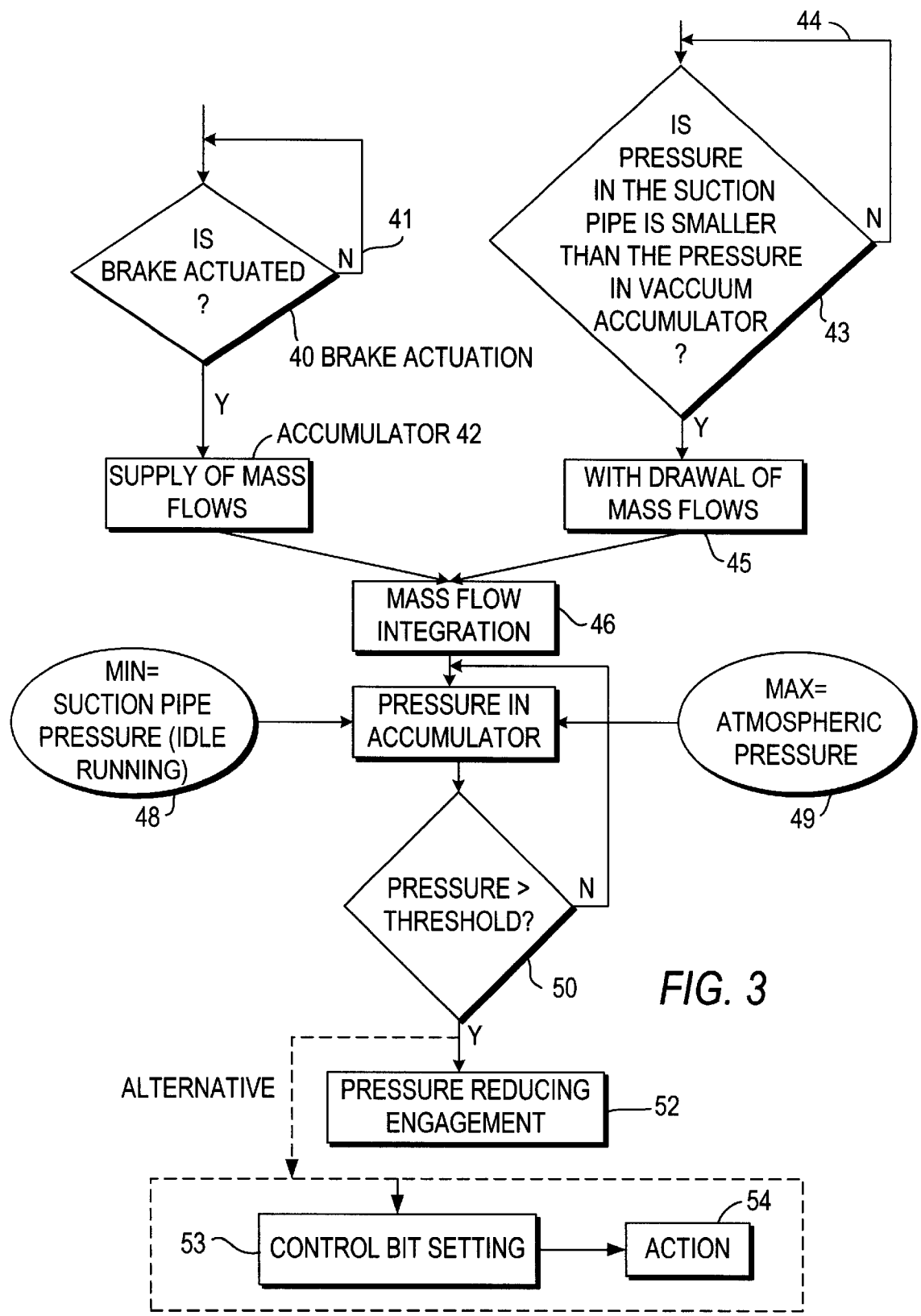
FIG. 3 is a view showing an embodiment of the inventive method illustrated by a flow chart.

A flow chart shown in FIG. 3 illustrates a preferable embodiment of the inventive model computation. In the case of a brake actuation 40, which for example is sensible by the brake (light) switches, a mass flow in form of a stepped function is supplied to an accumulator 42. If no brake actuation is available at 41, the model is retained in its waiting loop. In parallel, it is checked whether the pressure in the suction pipe is smaller than the pressure in the vacuum accumulator at 43. If this is true, a mass flow is withdrawn from the accumulator. Otherwise, the model again stops a in waiting loop.

The supplied or withdrawn mass flows are integrated in 46. Based on the general gas equation, the pressure actually acting in the vacuum accumulator is determined from the produced mass balance in 47. It is compared with a minimal value of the suction pipe pressure during idle running of the internal combustion engine in 48 and set equal to this value when this minimal value due to the integration (artificial) must be exceeded. Correspondingly, this value is compared with the maximum value, namely the atmospheric pressure, at 49 and set to be equal to the maximum value when this value must be exceeded.

The thusly provided pressure is compared with a predetermined threshold value at 50, and in the case of the exceeding of this threshold value 51 a pressure-reducing engagement 52, for example a corresponding adjustment of the throttle flap, is performed. In the case when the threshold value is not exceeded, it is sent back to step 47 and a new actual pressure value is determined by the integrator 46.

Alternatively to the engagement 52, a control bit can be set at 53. It releases a corresponding action, for example the emission of a warning signal or the illumination of a control light.

Figure 4:
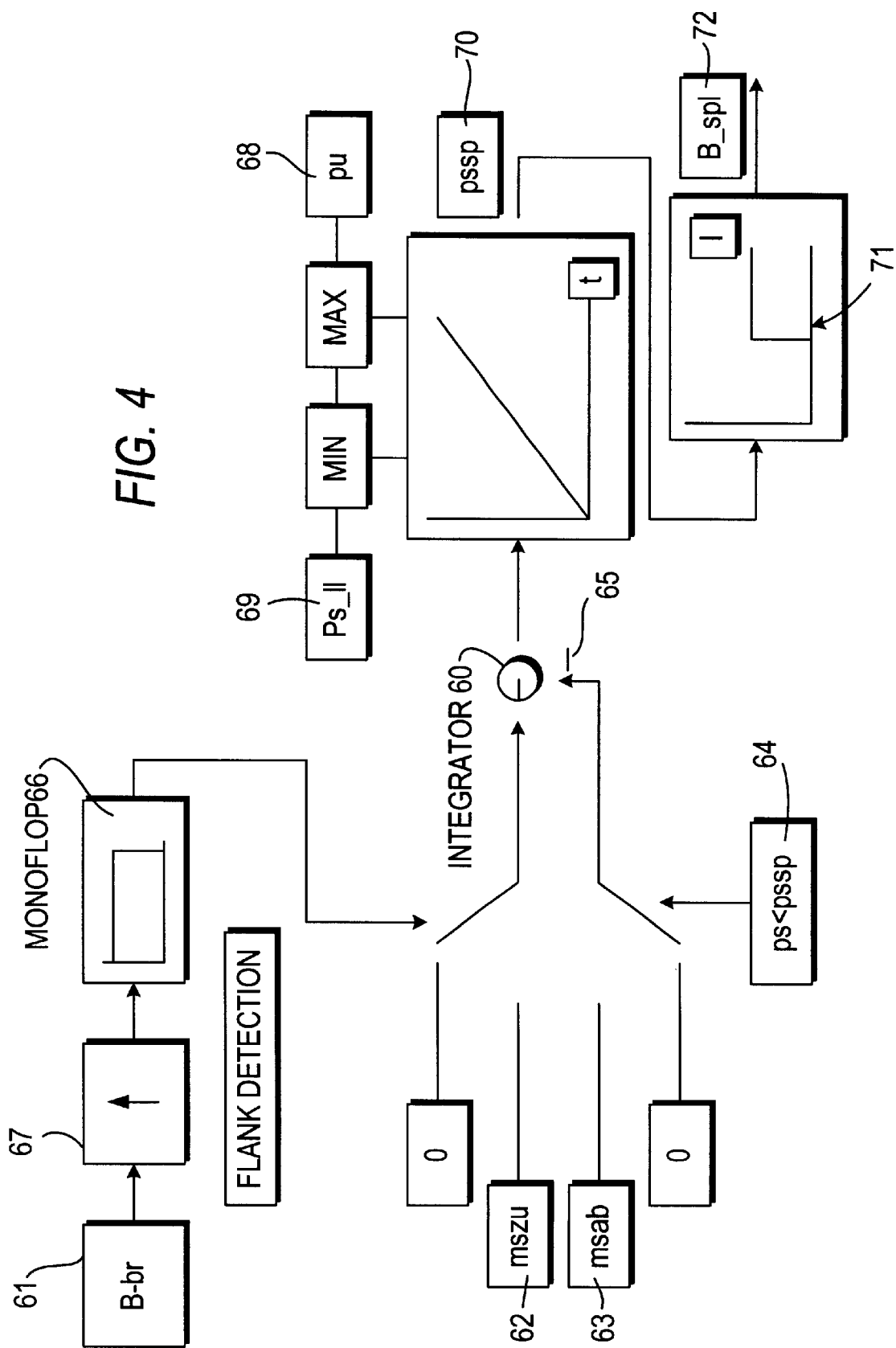
FIG. 4 is a functional block diagram of the inventive control device.

As can be seen from the block diagram of FIG. 4, the accumulator content is modeled by an integrator 60 whose pressure pccp increases when during actuation 61 of the brake (B-br=1) the air mszu 62 flows into the accumulator and its pressure sinks 63, when under a suction pipe pressure threshold 64 (ps<PS threshold) the air msab is aspirated from the accumulator at 65. In a first approximation the inflowing and outflowing air flow is set as constant.

In each brake actuation 61 air flows for a predetermined time in the accumulator 60. It is realized by a monoflop 66 which is triggered by the flank 67 of the brake actuation 61 (B-br 0→1). The air is aspirated at 65 when the suction pipe pressure is below the accumulator pressure 64. No air flows any longer when the accumulator 60 reaches the atmospheric pressure 68. The computation is supported by limiting the integrator 60 to the atmospheric pressure 68. No air flows anymore at 65 when the accumulator pressure reaches the suction pipe pressure 69.

When the accumulator pressure pccp 70 increases over a threshold 71, the bit B-spl 72 is set. Then either an error lamp can be controlled or corresponding control or warning signal are released, whereby it is possible for the driver to perform the corresponding actions.

It will be understood that each of the elements described above, or two or more together, may also find a useful application in other types of methods and constructions differing from the types described above.

While the invention has been illustrated and described as embodied in method of and device for operating a vacuum accumulator of an internal combustion engine, provided for servo function, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of operating an internal combustion engine of a motor vehicle provided with a vacuum accumulator which provides an auxiliary energy required for at least one servo function of the internal combustion engine in form of a vacuum and which is acted upon by a vacuum acting in a suction pipe of the internal combustion engine, the method comprising the steps of computing a pressure acting in the vacuum accumulator; supplying mass flows to the vacuum accumulator when at least one servo function is performed; withdrawing the mass flows from the vacuum accumulator when a pressure acting in the suction pipe is smaller than the pressure acting in the vacuum accumulator; and computing the pressure acting in the vacuum accumulator from a mass balance of the mass flows supplied to the vacuum accumulator and withdrawn from the vacuum accumulator; and further comprising computing the mass flows supplied to the vacuum accumulator by a stepped function which is triggered by a signal flank representative of a performance of a servo function.

2. A method as defined in claim 1, and further comprising the step of summing or integrating at least one of the mass flows supplied to the vacuum accumulator and the mass flows withdrawn from the vacuum accumulator progressively with corresponding signs.

3. A method as defined in claim 1, wherein said withdrawing of the mass flows from the vacuum accumulator includes withdrawing the mass flows only when a difference between the pressure acting in the suction pipe and pressure acting in the vacuum accumulator exceeds a predetermined threshold value.

4. A method as defined in claim 1, and further comprising the steps of computing at least one of the mass flows supplied to the vacuum accumulator and the mass flows withdrawn from the vacuum accumulator from operational conditions of the internal combustion engine of the motor vehicle.

5. A method of operating an internal combustion engine of a motor vehicle provided with a vacuum accumulator which provides an auxiliary energy required for at least one servo function of the internal combustion engine in form of a vacuum and which is acted upon by a vacuum acting in a suction pipe of the internal combustion engine, the method comprising the steps of computing a pressure acting in the vacuum accumulator; supplying mass flows to the vacuum accumulator when at least one servo function is performed; withdrawing the mass flows from the vacuum accumulator when a pressure acting in the suction pipe is smaller than the pressure acting in the vacuum accumulator; and computing the pressure acting in the vacuum accumulator from a mass balance of the mass flows supplied to the vacuum accumulator and withdrawn from the vacuum accumulator; and further comprising, depending on the pressure computed from the mass balance and acting in the vacuum accumulator, the step of providing an engagement of the internal combustion engine which lowers the pressure in the vacuum accumulator by adjusting a throttle flap provided in the suction pipe.

6. A method as defined in claim 5; and further comprising the step of summing or integrating at least one of the mass flows supplied to the vacuum accumulator and the mass flows withdrawn from the vacuum accumulator progressively with corresponding signs.

7. A method as defined in claim 5, wherein said withdrawing of the mass flows from the vacuum accumulator includes withdrawing the mass flows only when a difference between the pressure acting in the suction pipe and a pressure acting in the vacuum accumulator exceeds a predetermined threshold value.

8. A method as defined in claim 5, and further comprising the steps of computing at least one of the mass flows supplied to the vacuum accumulator and the mass flows withdrawn from the vacuum accumulator from operational conditions of the internal combustion engine of the motor vehicle.

9. A method as defined in claim 5; and further comprising setting a corresponding flag and releasing a control or warning signal, in dependence on a pressure which is calculated from the mass balance and acts in the vacuum accumulator.

10. A method as defined in claim 5; and further comprising the step of using a pressure sensor for a function monitoring of the computed pressure acting in the vacuum accumulator.

11. A method of operating an internal combustion engine of a motor vehicle provided with a vacuum accumulator which provides an auxiliary energy required for at least one servo function of the internal combustion engine in form of a vacuum and which is acted upon by a vacuum acting in a suction pipe of the internal combustion engine, the method comprising the steps of computing a pressure acting in the vacuum accumulator; supplying mass flows to the vacuum accumulator when at least one servo function is performed; withdrawing the mass flows from the vacuum accumulator when a pressure acting in the suction pipe is smaller than the pressure acting in the vacuum accumulator; and computing the pressure acting in the vacuum accumulator from a mass balance of the mass flows supplied to the vacuum accumulator and withdrawn from the vacuum accumulator; and further comprising setting a corresponding flag and releasing a control or warning signal, in dependence on a pressure which is calculated from the mass balance and acts in the vacuum accumulator.

12. A method of operating an internal combustion engine of a motor vehicle provided with a vacuum accumulator which provides an auxiliary energy required for at least one servo function of the internal combustion engine in form of a vacuum and which is acted upon by a vacuum acting in a suction pipe of the internal combustion engine, the method comprising the steps of computing a pressure acting in the vacuum accumulator; supplying mass flows to the vacuum accumulator when at least one servo function is performed; withdrawing the mass flows from the vacuum accumulator when a pressure acting in the suction pipe is smaller than the pressure acting in the vacuum accumulator; and computing the pressure acting in the vacuum accumulator; from a mass balance of the mass flows supplied to the vacuum accumulator and withdrawn from the vacuum accumulator; and further comprising the step of using a pressure sensor for a function monitoring of the computed pressure acting in the vacuum accumulator.

13. A control device for an internal combustion engine of a motor vehicle provided with a vacuum accumulator which provides an auxiliary energy required for at least one servo function of the internal combustion engine in form of a vacuum and which is acted upon by a vacuum from a suction pipe of the internal combustion engine, the control device comprising means for determining an actuation of at least one servo function; means for sensing a pressure acting in the suction pipe; means for computing a pressure acting in the vacuum accumulator; means for supplying mass flows to the vacuum accumulator when at least one servo function is performed; means for withdrawing mass flows from the vacuum accumulator when a pressure acting in the suction pipe is smaller than a pressure acting in the vacuum accumulator; and means for computing a pressure acting in the vacuum accumulator from a mass balance of mass flows supplied to and withdrawn from the vacuum accumulator; and further comprising means for detecting a signal flank representative of performing a servo function; and means for computing mass flows supplied to the vacuum accumulator by means of a stepped function.

14. A control device as defined in claim 13; and further comprising means for summing or integrating at least one of mass flows supplied to the vacuum accumulator and mass flows withdrawn from the vacuum accumulator.

15. A control device for an internal combustion engine of a motor vehicle provided with a vacuum accumulator which provides an auxiliary energy required for at least one servo function of the internal combustion engine in form of a vacuum and which is acted upon by a vacuum from a suction pipe of the internal combustion engine, the control device comprising means for determining an actuation of at least one servo function; means for sensing a pressure acting in the suction pipe; means for computing a pressure acting in the vacuum accumulator; means for supplying mass flows to the vacuum accumulator when at least one servo function is performed; means for withdrawing mass flows from the vacuum accumulator when a pressure acting in the suction pipe is smaller than a pressure acting in the vacuum accumulator; and means for computing a pressure acting in the vacuum accumulator from a mass balance of mass flows supplied to and withdrawn from the vacuum accumulator; and further comprising means for providing engagement of the internal combustion engine which reduces the pressure in the vacuum accumulator, by adjusting a throttle flap provided in the suction pipe in dependence on the pressure which is computed from the mass balance and acts in the vacuum accumulator.

16. A control device for an internal combustion engine of a motor vehicle provided with a vacuum accumulator which provides an auxiliary energy required for at least one servo function of the internal combustion engine in form of a vacuum and which is acted upon by a vacuum from a suction pipe of the internal combustion engine, the control device comprising means for determining an actuation of at least one servo function; means for sensing a pressure acting in the suction pipe; means for computing a pressure acting in the vacuum accumulator; means for supplying mass flows to the vacuum accumulator when at least one servo function is performed; means for withdrawing mass flows from the vacuum accumulator when a pressure acting in the suction pipe is smaller than a pressure acting in the vacuum accumulator; and means for computing a pressure acting in the vacuum accumulator from a mass balance of mass flows supplied to and withdrawn from the vacuum accumulator; and further comprising means for setting a flag in dependence on the pressure computed from the mass balance and acting in the vacuum accumulator; and means for providing a corresponding control or warning signal.

17. A control device for an internal combustion engine of a motor vehicle provided with a vacuum accumulator which provides an auxiliary energy required for at least one servo function of the internal combustion engine in form of a vacuum and which is acted upon by a vacuum from a suction pipe of the internal combustion engine, the control device comprising means for determining an actuation of at least one servo function; means for sensing a pressure acting in the suction pipe; means for computing a pressure acting in the vacuum accumulator; means for supplying mass flows to the vacuum accumulator; means for supplying mass flows to the vacuum accumulator when at least one servo function is performed; means for withdrawing mass flows from the vacuum accumulator when a pressure acting in the suction pipe is smaller than a pressure acting in the vacuum accumulator; and means for computing a pressure acting in the vacuum accumulator from a mass balance of mass flows supplied to and withdrawn from the vacuum accumulator; and further comprising means for function monitoring of a pressure sensor in accordance with the computed pressure acting in the vacuum accumulator.

* * * * *